United States Patent
Frach

(10) Patent No.: US 9,176,241 B2
(45) Date of Patent: Nov. 3, 2015

(54) POSITION-SENSITIVE READOUT MODES FOR DIGITAL SILICON PHOTOMULTIPLIER ARRAYS

(75) Inventor: Thomas Frach, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 4 days.

(21) Appl. No.: 14/234,650

(22) PCT Filed: Jul. 27, 2012

(86) PCT No.: PCT/IB2012/053837
§ 371 (c)(1),
(2), (4) Date: Jan. 24, 2014

(87) PCT Pub. No.: WO2013/018006
PCT Pub. Date: Feb. 7, 2013

(65) Prior Publication Data
US 2014/0175294 A1    Jun. 26, 2014

Related U.S. Application Data

(60) Provisional application No. 61/514,504, filed on Aug. 3, 2011.

(51) Int. Cl.
G01T 1/24 (2006.01)
H04N 5/369 (2011.01)
G01T 1/20 (2006.01)
G01T 1/29 (2006.01)

(52) U.S. Cl.
CPC ............. *G01T 1/248* (2013.01); *G01T 1/2018* (2013.01); *G01T 1/249* (2013.01); *G01T 1/2985* (2013.01); *H04N 5/369* (2013.01)

(58) Field of Classification Search
CPC ...................................................... H04N 5/369
See application file for complete search history.

(56) References Cited

U.S. PATENT DOCUMENTS

| | | | |
|---|---|---|---|
| 4,672,207 A * | 6/1987 | Derenzo | ................. 250/363.02 |
| 5,099,128 A | 3/1992 | Stettner | |
| 5,619,040 A | 4/1997 | Shapiro et al. | |
| 7,557,354 B2 | 7/2009 | Okada | |
| 7,626,389 B2 | 12/2009 | Fiedler et al. | |
| 7,759,650 B2 | 7/2010 | Heringa et al. | |

(Continued)

FOREIGN PATENT DOCUMENTS

| | | | |
|---|---|---|---|
| WO | 2008142590 A2 | 11/2008 | |
| WO | 2010074400 A2 | 1/2010 | |

(Continued)

*Primary Examiner* — Constantine Hannaher

(57) ABSTRACT

A photon detector (10) includes a detector array (12) comprising single photon avalanche diode (SPAD) detectors (14) configured to break down responsive to impingement of a photon. Trigger circuitry (34) is configured to generate a trigger signal responsive to break down of a SPAD detector of the detector array. Latches (20, 22) are configured to store position coordinates of SPAD detectors of the detector array that are in break down. The latches are configured to latch responsive to a trigger signal generated by the trigger circuitry. The latches may include row latches (22) each connecting with a logical "OR" combination of SPAD detectors of a corresponding row of the detector array, and column latches (20) each connecting with a logical "OR" combination of SPAD detectors of a corresponding column of the detector array. Time to digital converter (TDC) circuitry (28) may generate a digital time stamp for the trigger signal.

18 Claims, 4 Drawing Sheets

(56) References Cited

U.S. PATENT DOCUMENTS

Figure 1:
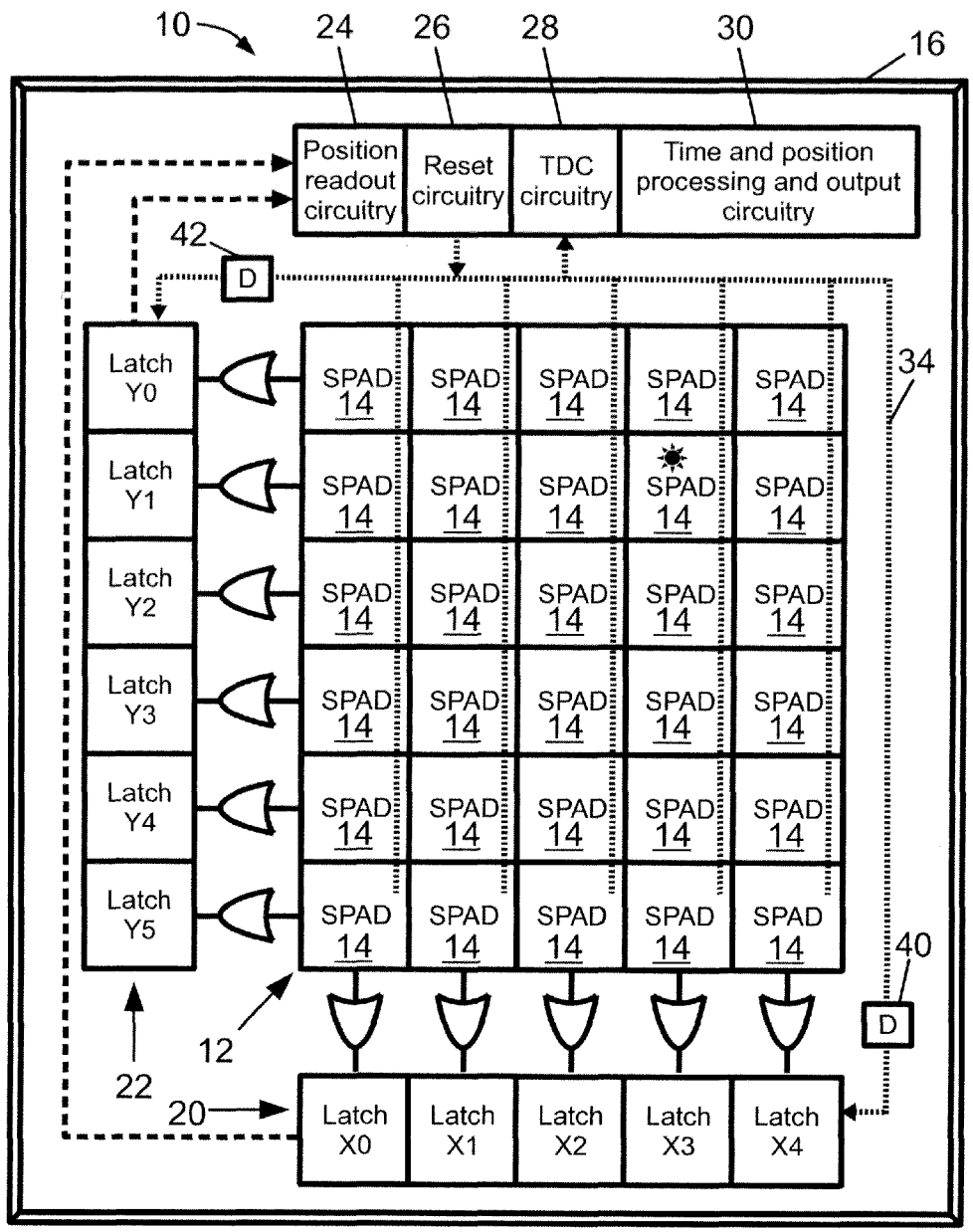

| | | |
|---|---|---|
| 2005/0253073 A1 | 11/2005 | Joram et al. |
| 2006/0202129 A1 | 9/2006 | Niclass et al. |
| 2010/0127314 A1 | 5/2010 | Frach |
| 2010/0176301 A1 | 7/2010 | Wieczorek et al. |
| 2010/0182011 A1 | 7/2010 | Prescher et al. |
| 2010/0200763 A1 | 8/2010 | Thon et al. |
| 2010/0245809 A1 | 9/2010 | Andreou et al. |
| 2010/0264320 A1 | 10/2010 | Takayama et al. |
| 2011/0017918 A1 | 1/2011 | Baeumer et al. |
| 2011/0079727 A1 | 4/2011 | Prescher et al. |

FOREIGN PATENT DOCUMENTS

| | | |
|---|---|---|
| WO | 2010070487 A2 | 6/2010 |
| WO | 2010073136 A2 | 7/2010 |
| WO | 2010073137 A1 | 7/2010 |
| WO | 2010136910 A2 | 12/2010 |

* cited by examiner

POSITION-SENSITIVE READOUT MODES FOR DIGITAL SILICON PHOTOMULTIPLIER ARRAYS

CROSS REFERENCE TO RELATED APPLICATIONS

This application is a national filing of PCT application Serial No. PCT/IB2012/053837, filed Jul. 27, 2012, published as WO 2013/018006 A1 on Feb. 7, 2013, which claims the benefit of U.S. provisional application Ser. No. 61/514,504 filed Aug. 3, 2011, which is incorporated herein by reference.

The following relates to the radiation detection arts. It particularly relates to high-speed and high spatial resolution radiation detectors for applications in physics, astronomy, radiological imaging such as positron emission tomography (PET) or single-photon emission tomography (SPECT), or so forth.

Photon counting light detection finds application in diverse fields such as physics, astronomy, and medical imaging. By way of some illustrative examples, photon counting light detection is useful in physics application such as Cherenkov detectors, engineering applications such as light detection and ranging (LIDAR) applications, biology applications such as low-light fluorescence measurements, low-light astronomical telescope facilities, and so forth. (As used herein, the term "photon" refers to a quantum particle of electromagnetic radiation. The term "photon" encompasses visible light photons, e.g. a 1.96 eV photon corresponding to one quantum particle of 632.8 nm HeNe laser light. The term "photon" also encompasses a quantum particle of "light" or electromagnetic energy lying outside of the visible spectrum. For example, the term "photon" also encompasses a quantum particle of ultraviolet or infrared radiation).

Photon counting has conventionally been implemented using photomultiplier tube (PMT) detectors, which comprise a light-sensitive photocathode and a set of "multiplier" anode terminals. The photocathode emits at least one electron responsive to impingement of a photon, and the electron(s) in turn strike successive anode terminals with each such event causing emission of a cascade of electrons, thus producing a multiplication effect that results in a measurable electrical pulse. A PMT is capable of high speed photon counting. PMT detectors have disadvantages including being relatively bulky discrete devices with large optical windows that operate at high voltage and are susceptible to failure due to the evacuated tube design and the high operational electrical voltage.

Silicon photomultiplier (SiPM) devices have been developed to overcome some of these disadvantages, and to provide photon-counting detectors that are readily integrated with silicon-based signal/data processing circuitry. In some embodiments, a SiPM device employs an avalanche photodiode as the light sensor. When biased above its breakdown voltage, the avalanche diode goes into break down responsive to impingement of a single photon. Such a device is sometimes called a single photon avalanche diode (SPAD) detector. In a typical SPAD detector, the avalanche photodiode is reverse biased above its break down voltage and is in series with a quenching resistor. Impingement of a single photon causes the p-n junction to break down in a multiplicative (i.e., "avalanche") cascade of electrons that flow in the SPAD detector as a measurable electrical current. This current is quenched relatively quickly as voltage over the resistor due to the current flow lowers the reverse bias across the avalanche diode to a level below its break down voltage. Additionally or alternatively, an active quenching sub-circuit comprising (for example) one or more diodes, resistors, and/or transistors can provide more rapid quenching.

A SPAD detector is relatively small, but larger area detection can be achieved by a two-dimensional array of SPAD detectors. The readout can be analog or digital. In an analog design, the SPAD detectors are interconnected in a logical "OR" circuit so that break down of any one SPAD detector activates the logical "OR" combination. In a digital design, the array operates a digital counter that is read out after an integration period. In either case, the readout circuitry has a single channel.

For some applications, such as time-of-flight positron emission tomography (PET) imaging, the time of detection is important. Advantageously, silicon-based time stamping including time-to-digital conversion (TDC) circuitry can be monolithically integrated with a SPAD array on a silicon platform this purpose.

However, achieving high spatial resolution with a SPAD array is difficult. Existing designs that employ a logical "OR" combination of SPAD detectors cannot distinguish which SPAD detector of the combination detected the photon. A potential solution is to provide individualized readout circuitry for each SPAD detector. However, this increases system complexity and cost as each SPAD detector would have its own readout channel. Achieving both high spatial resolution and high temporal resolution with a SPAD array is even more difficult. It is typically not practical to provide both individualized readout and individualized time stamping for each SPAD detector.

The following contemplates improved apparatuses and methods that overcome the aforementioned limitations and others.

According to one aspect, an apparatus comprises a photon detector including: a detector array comprising single photon avalanche diode (SPAD) detectors configured to break down responsive to impingement of a photon; trigger circuitry configured to generate a trigger signal responsive to break down of a SPAD detector of the detector array; and latches configured to store position coordinates of SPAD detectors of the detector array that are in break down, the latches being configured to latch responsive to a trigger signal generated by the trigger circuitry.

According to another aspect, a method comprises: providing a detector array comprising single photon avalanche diode (SPAD) detectors configured to break down responsive to impingement of a photon in a position; providing latches configured to store position coordinates of a SPAD detector of the detector array that is in break down; generating a trigger signal responsive to break down of a SPAD detector of the detector array; and latching the latches responsive to the trigger signal.

According to another aspect, an apparatus comprises a photon detector including: an array of single photon avalanche diode (SPAD) detectors; latches configured to store position coordinates of a SPAD detector of the array that is in breakdown; triggering circuitry configured to generate a trigger signal responsive to break down of a SPAD detector of the array wherein the trigger signal causes latching of the latches; and processing circuitry configured to output a photon detection position based on position coordinates stored in the latched latches.

According to another aspect, an apparatus comprises a photon detector including: an array of single photon avalanche diode (SPAD) detectors; latches configured to store position coordinates of SPAD detectors of the array that are in breakdown; triggering circuitry configured to generate a trigger signal responsive to break down of a SPAD detector of the array wherein the trigger signal causes latching of the latches; at least one delay element that delays the latching by an integration time; and processing circuitry configured to output detection positions of photons detected over the integration time based on position coordinates stored in the latched latches.

One advantage resides in providing high spatial resolution with a SPAD array employing relatively simple readout circuitry with a single (x,y) position channel.

Another advantage resides in providing both high spatial resolution and high temporal resolution with a SPAD array employing relatively simple readout circuitry with a single (x,y) position channel and a single time output channel for the array.

Numerous additional advantages and benefits will become apparent to those of ordinary skill in the art upon reading the following detailed description.

The invention may take form in various components and arrangements of components, and in various process operations and arrangements of process operations. The drawings are only for the purpose of illustrating preferred embodiments and are not to be construed as limiting the invention.

FIG. 1 diagrammatically shows an overhead or planar view of an array of single photon avalanche diode (SPAD) detectors and associated spatial position readout and time stamping circuitry.

Figure 2:
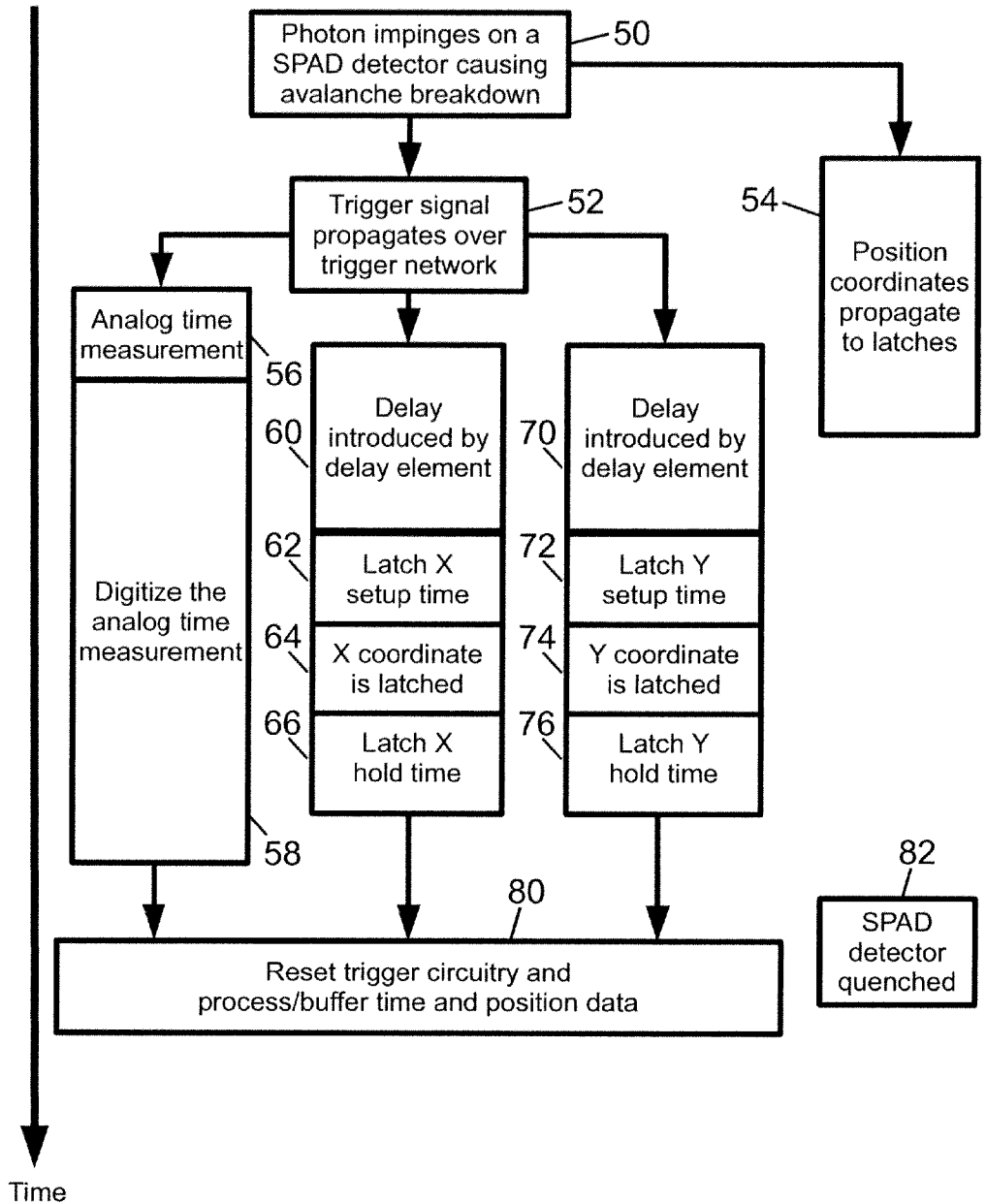

FIG. 2 diagrammatically shows timing aspects of one disclosed mode of operation of the SPAD array of FIG. 1.

Figure 3:
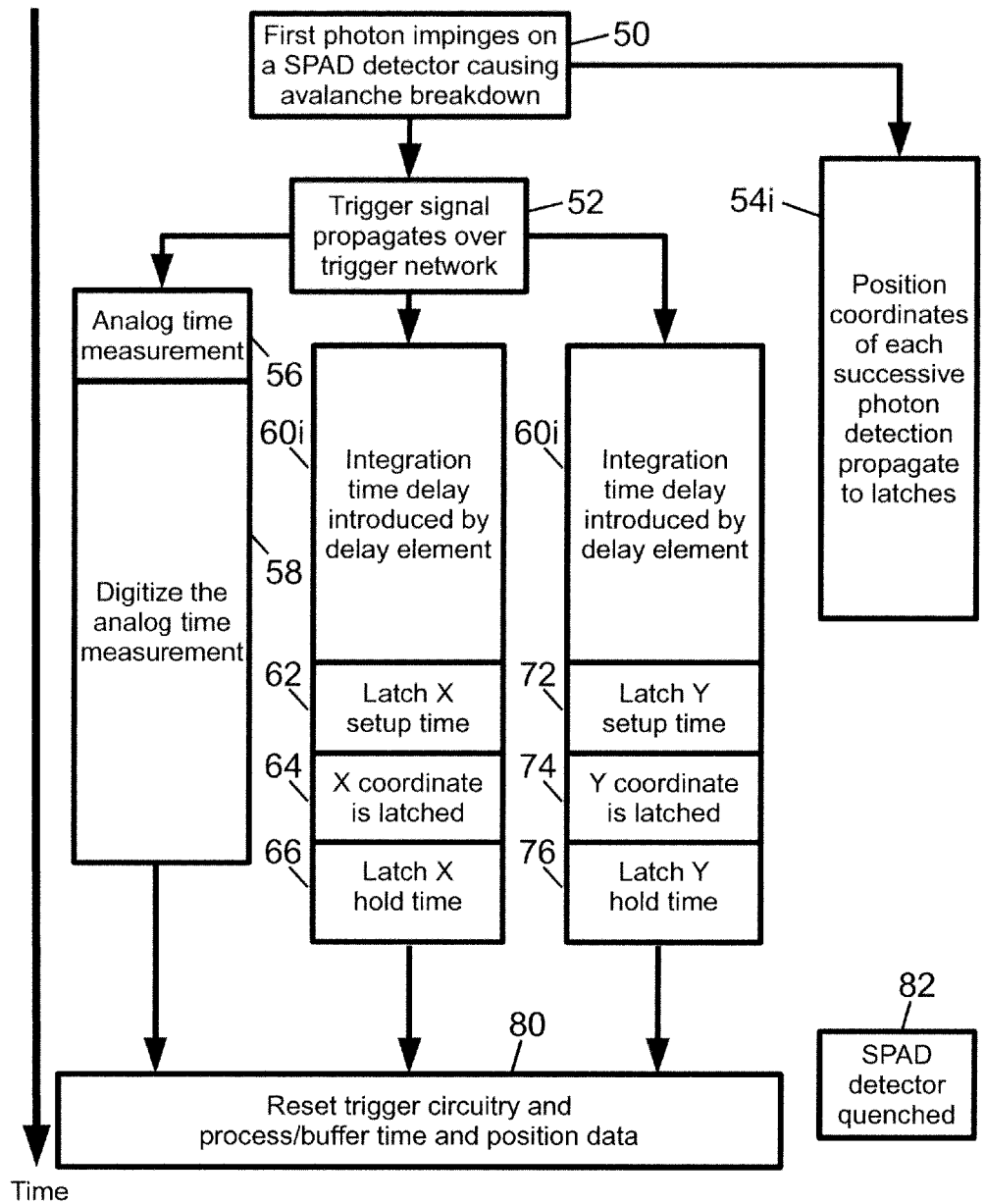

FIG. 3 diagrammatically shows timing aspects of another disclosed mode of operation of the SPAD array of FIG. 1.

Figure 4:
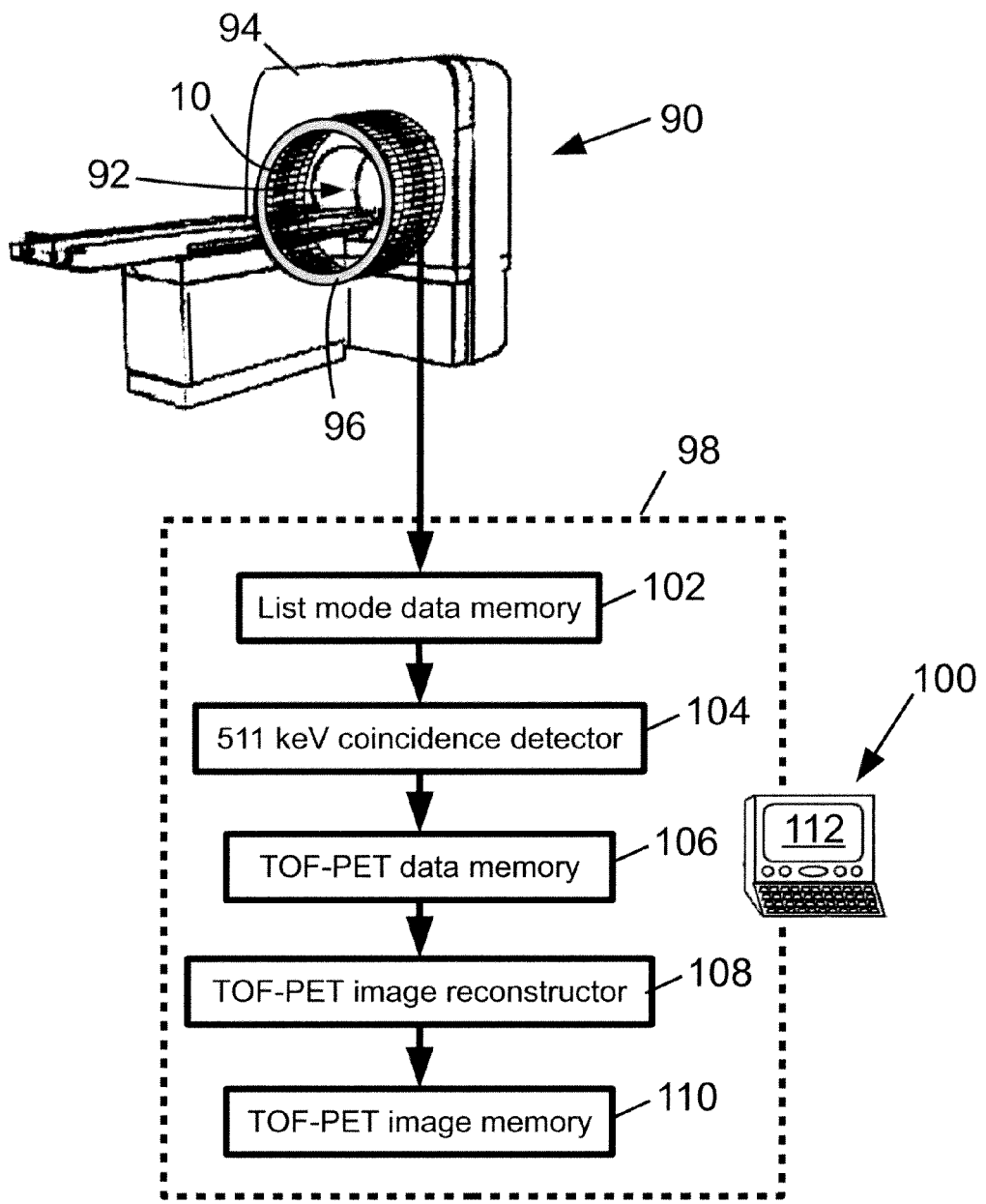

FIG. 4 diagramatically shows a time-of-flight (TOF) positron emission tomography (PET) imaging system employing SPAD arrays as described with reference to FIGS. 1 and 2 as the detectors.

With reference to FIG. 1, a photon detector 10 includes a detector array 12 comprising an array of single photon avalanche diode (SPAD) detectors 14. Each SPAD detector 14 suitably comprises an avalanche diode reversed biased above its breakdown voltage and connected with a quenching circuit, such as a passive quenching resistor placed electrically in series with the avalanche diode in some embodiments, or an active transistor-based quenching circuit (details not illustrated). The SPAD detector operates in a photon counting or Geiger mode in which impingement of a single photon on the avalanche diode produces break down and consequent electron multiplication and substantial electrical current flow, which is then quenched by the quenching circuit. The illustrative detector array 12 comprises a rectangular array with five columns indexed X0-X4 and six rows indexed Y0-Y5. This is merely illustrative, and the detector array can have substantially any number of rows and columns.

The illustrative photon detector 10 is a silicon-based device fabricated on a silicon substrate 16. This enables the detector array 12 to be monolithically integrated on the silicon substrate 16 with auxiliary silicon-based components, such as illustrative silicon-based column readout latches 20 (where the column coordinate is denoted in the illustrative embodiment as X), illustrative silicon-based row readout latches 22 (where the row coordinate is denoted in the illustrative embodiment as Y), illustrative silicon-based position readout circuitry 24, illustrative silicon-based reset circuitry 26, illustrative silicon-based time-to-digital conversion (TDC) circuitry 28, and illustrative silicon-based time and position processing and output circuitry 30. Although these various components 14, 20, 22, 24, 26, 28, 30 are silicon-based in the illustrative embodiment, it is understood that these silicon based components may include non-silicon and/or silicon alloy materials such as various oxides, insulators, or dielectrics (e.g., silicon oxides, nitrides, or oxynitrides, or non-silicon-containing dielectrics), various silicon alloys (e.g., silicon-germanium or silicon-germanium-carbon alloys), layers of metals or metal alloys, or so forth. Moreover, the various circuitry can be variously implemented by discrete components, integrated circuitry (IC), or various combinations thereof.

The illustrative photon detector 10 employs readout circuitry that enables high spatial resolution for a photon detection event (typically down to the individual SPAD detector 14 that detected the photon), and concurrent high temporal resolution for the photon detection event (e.g., temporal resolution at or close to the resolution of the TDC circuitry 28). Toward this end, the SPAD detectors 14 of the detector array 12 are electrically interconnected in rows and columns, with each row latch 22 (latches Y0, ..., Y5) connecting with a logical "OR" combination of SPAD detectors of a corresponding row of the detector array 12, and each column latch 20 (latches X0, ..., X4) connecting with a logical "OR" combination of SPAD detectors of a corresponding column of the detector array 12.

In illustrative FIG. 1, the logical "OR" connections with the latches 20, 22 is diagrammatically indicated using logical "OR" gate element symbols. However, it is to be understood that the term "logical 'OR'" as used herein encompasses any inclusive disjunction or alternation that outputs a "true" or "on" or "activated" (et cetera) value whenever one of the SPAD detectors of the logical "OR" combination of detectors is in break down. The specific implementation of the logical "OR" combination may or may not employ a logical "OR" gate element. For example, the logical "OR" combination of detectors may be implemented by a combination of logical "NOT" and logical "NAND" gate elements in accordance with DeMorgan's law. In a "wired OR" embodiment the SPAD detectors are physically wired together to implement the logical "OR".

The readout circuitry also includes trigger circuitry 34, which is diagrammatically indicated by dotted lines in FIG. 1. The trigger circuitry connects with every SPAD detector 14 of the detector array 12, and the break down of any SPAD detector 14 of the detector array 12 causes the trigger circuitry 34 to generate a trigger signal. Said another way, the trigger circuitry 34 is configured to generate a trigger signal responsive to break down of a SPAD detector 14 of the detector array 12. The trigger signal propagates via the trigger circuitry 34 to both the TDC circuitry 28, where it triggers the generation of a time stamp, and to the latches 20, 22 where it causes the latches 20, 22 to latch. Thus, when any SPAD detector 14 of the detector array 12 detects a photon and accordingly breaks down, it generates a trigger signal on the trigger circuitry 34 and, in parallel, the latches store the position of the SPAD detector 14 that undergoes break down.

With continuing reference to FIG. 1, by way of illustrative example an asterisk (*) is shown at the SPAD detector 14 at row Y1 and column X3 of the detector array 12. This breakdown causes latch Y1 of the column latches 22 and row latch X3 of the row latches 20 to store values indicating "true" or "on" or "activated". At the same time, the breakdown of the SPAD detector 14 at row Y1 and column X3 causes the trigger circuitry 34 to generate a trigger signal that propagates both to the TDC circuitry 28 to generate a time stamp and to the latches 20, 22 to cause latching of the latches 20, 22 so as to preserve the "true" or "on" or "activated" value of the latches Y1 and X3. The position readout circuitry 24 can then read out these position values from the latches 20, 22 using a suitable (and optionally relatively slow) readout technique such as a look-up table or sequential counter which translates the bit patterns of the latches 20, 22 into a binary number or other position representation.

This readout approach relies upon the break down of the SPAD detector 14 being stored into the latches 20, 22 before the latching/positional readout operations. Depending upon the relative speeds of the trigger signal propagation and latch storing operations, this order of operations may occur naturally (e.g., if the logical "OR" connections and latches 20, 22 operate substantially faster than the trigger circuitry 34). However, for high temporal resolution it is desirable for the trigger circuitry 34 to operate as fast as practicable in order to obtain a high resolution time stamp.

Accordingly, in the illustrative embodiment delay elements 40, 42 are provided to delay propagation of the trigger signal to the latches 20, 22 by an amount effective to ensure that the latches 20, 22 upon latching store the position coordinates of the SPAD detector 14 whose break down caused the trigger circuitry 34 to generate the trigger signal. Although two delay elements 40, 42 are shown in illustrative FIG. 1 to provide delays for respective latches 20, 22, depending upon the physical layout of the trigger circuitry it may be possible to use as few as a single delay element (for example, a delay element after which the transmission line breaks off to feed the row and column latches).

With continuing reference to FIG. 1 and with further reference to FIG. 2, operation of the photon detector 10 is further described. In an event 50, a photon impinges upon a SPAD detector 14 of the detector array 12 causing avalanche breakdown of that SPAD detector 14. This breakdown causes two distinct results. In a causal result 52, the breakdown causes the trigger circuitry 34 to generate and propagate a trigger signal. In a causal result 54, the breakdown causes the position coordinates of the SPAD detector 14 that undergoes breakdown to propagate via the logical "OR" connections to the respective column and row latches 20, 22.

The trigger signal in turn causes three causal result event chains. In a first causal event chain, the trigger signal propagates to the TDC circuitry 28 where it causes the TDC circuitry 28 to generate a time stamp. In illustrative FIG. 2, the time stamping operation entails two sub-operations: an analog time measurement 56 and a digitization operation 58 via which the analog time measurement is digitized to generate the digital time stamp. The analog time measurement 56 can utilize any event time measurement technique, such as a delay transmission line, a ring oscillator, or so forth. The digitization operation 58 digitizes the analog time measurement. Typically, the analog time measurement provides the fine time measurement providing high time resolution. The digitization operation 58 in some embodiments adds this fine (digitized) time measurement to the value of a digital clock (which provides coarse time measurement as compared with the transmission delay line, ring oscillator, or other fine analog time measurement) in order to generate a high resolution time stamp on the extended time scale of the digital clock.

In a second causal event chain caused by the trigger signal, the column (i.e., X) position coordinate is latched by the column (X) latches 20 in response to the trigger signal. This causal event chain includes an optional initial delay 60 introduced by the optional delay element 40. In the timing shown in FIG. 2, the delay 60 ensures that the position coordinates propagation 54 to the latches 20, 22 is completed before the latching operation which includes a setup time 62 preceding latching 64 of the column (X) latches 20 followed by a hold time 66. The setup and hold times 62, 66 are determined by the design of the column latches 20, and are the time interval preceding and succeeding the latching operation during which the values stored in the latches 20 should be stable in order to ensure integrity of the latching operation 64.

In a third causal event chain caused by the trigger signal, the row (i.e., Y) position coordinate is latched by the row (Y) latches 22 in response to the trigger signal. This causal event chain includes an optional initial delay 70 introduced by the optional delay element 42. In the timing shown in FIG. 2, the delay 70 ensures that the position coordinates propagation 54 to the latches 20, 22 is completed before the latching operation which includes a setup time 72 preceding latching 74 of the row (Y) latches 22 followed by a hold time 76. The setup and hold times 72, 76 are determined by the design of the row latches 22, and are the time interval preceding and succeeding the latching operation during which the values stored in the latches 22 should be stable in order to ensure integrity of the latching operation 74.

The latching operation components 62, 64, 66, 72, 74, 76 shown in FIG. 2 are merely illustrative, and the detailed latching operation may vary depending upon the design and characteristics of the latches 20, 22. Moreover, while FIG. 2 shows the row and column latching causal event chains as being identical in terms of time durations, it is also contemplated for the row and column latching causal event chains to have somewhat different timing characteristics.

A diagrammatic operation 80 shown in FIG. 2 collectively indicates operations entailed in completing the photon detection processing and output. The operation 80 includes resetting the trigger circuitry 34 (performed by the reset circuitry 26 diagrammatically shown in FIG. 1) and processing and buffering the time and position data for the photon detection event (performed by the time and position processing and output circuitry 30 diagrammatically shown in FIG. 1).

At some time after the SPAD detector breaks down, the quenching sub-circuit of the SPAD detector will cause it to quench and reset. A quench time 82 is diagrammatically indicated in FIG. 2—this quench time indicates the time at which the avalanche diode of the SPAD detector returns to the nonconductive reverse biased state. At the quench time 82 the SPAD detector is again ready to detect another photon; however, at the quench time 82 the SPAD detector is also no longer in break down. Accordingly, the latching operations 62, 64, 66, 72, 74, 76 must be completed prior to the quench time 82. On the other hand, the time stamp digitizing 58 and the completion operations 80 can be performed before and/or after the quench time 82. In other words, once the analog time measurement 56 and the latching 62, 64, 66, 72, 74, 76 is complete, the temporal and spatial resolution is achieved and the remaining data processing is not under aggressive time constraints imposed by the SPAD detector quenching. On the other hand, it is advantageous to complete the digitizing 58, the processing 80, and the quenching (terminating at quench time 82) as quickly as practicable since the SPAD detector cannot be used to detect another photon until these operations are complete.

The timing for resetting the trigger circuitry 34 (included in the completion operations 80) depends upon the operation of the trigger circuitry 34. If the trigger circuitry 34 generates the trigger signal responsive to a SPAD detector transitioning into break down, then it may be possible to reset the trigger circuitry 34 before the SPAD detector is quenched. On the other hand, if the trigger circuitry 34 generates the trigger signal responsive to a SPAD detector being in break down, then the trigger circuitry 34 cannot be reset until after the SPAD detector is quenched (that is, until after the quench time 82 shown in FIG. 2).

The reset portion of the completion operations 80 also includes unlatching the latches 20, 22. This can generally be done any time after the latched position data are processed and buffered. In some embodiments the latches 20, 22 may unlatch automatically, e.g. after the hold time 66, 76 is complete. In other embodiments the reset circuitry 26 sends a signal to unlatch the latches 20, 22. The reset portion of the completion operations 80 may optionally also include resetting the values stored in the latches 20, 22, for example by the reset circuitry 26 sending a suitable control signal to the latches 20, 22. Alternatively, if the latches 20, 22 are of a type that follows both 0→1 and 1→0 transitions prior to latching, then the values stored in the latches 20, 22 may be reset automatically once the SPAD detector in break down is quenched (that is, at the quench time 82) because at that time the logical "OR" tied to the latches returns to the "false" or "off" or "deactivated" (et cetera) value indicating that none of the SPAD detectors in the logical "OR" combination are in break down.

Operation of the photon detector 10 as described with reference to FIG. 2 provides single photon counting capability with high spatial and temporal resolution. It is effective for applications in which the impinging photon flux is sufficiently low that the average time between successive incoming photons is longer than the time of the processing described with reference to FIG. 2. An occasional instance of two photons arriving together can be accommodated insofar as the consequence of such an event would be to set two column latches, or two row latches. Thus, this can be detected by the completion operations 80 and the data can be discarded or suitably adjusted.

In some applications the impinging photon flux may be higher, at least over a time interval of interest, such that the processing described with reference to FIG. 2 cannot be completed during the interval between successive photon detection events. Such a situation may arise, for example, when the photon detector 10 is used in conjunction with a scintillator which generates a short burst of photons (i.e., a scintillation event) responsive to a radiation particle being detected by the scintillator. Another application example is imaging under light conditions which are of low intensity, but not so low as to employ the approach of FIG. 2.

With reference to FIG. 1 and with further reference to FIG. 3, for such higher photon flux applications another operating mode may be employed, whose timing is diagrammatically depicted in FIG. 3. In the operational mode of FIG. 2, the delays 60, 70 are optionally included to ensure positional data is stored in the latches 20, 22 before the latching 62, 64, 66, 72, 74, 76 is performed. In the embodiment of FIG. 3 these delays 60, 70 are replaced by a longer integration time delay 60i which is again suitably implemented by the delay elements 40, 42. Said another way, the delay time 60i introduced by the delay elements 40, 42 is longer in the embodiment of FIG. 3, so as to provide an integration time. In the embodiment of FIG. 3, it is also advantageous for the same delay time 60i to be introduced by both delay elements 40, 42 so that the row and column position data are integrated for the same time 60i. (As previously mentioned, in some contemplated embodiments this is achieved by constructing the delay elements 40, 42 for the respective column and row latches 20, 22 as a single delay element with the latching signal branching out from that single delay element to both sets of latches 20, 22.)

The delay time 60i is chosen to provide an integration time over which position data for photon detection events is accumulated. In the embodiment of FIG. 3, it is assumed that the incoming flux of photons is sufficiently high that more than one photon will impinge upon the detector array 12 during the integration time 60i. Each photon detection event will cause the SPAD detector 14 that detects the photon to enter breakdown and load its position data into the latches 20, 22. After the integration time 60i terminates the latching 62, 64, 66, 72, 74, 76 is performed as already described with reference to FIG. 2, so as to latch the position data for the photon detection events. In parallel, the operations 56, 58 operate as described with reference to FIG. 2, but triggered only by the first photon detection event so that the resulting digital timestamp will be for the first photon detection event.

In order to accumulate position data for all photon detection events over the integration time 60i, the position data stored in the latches 20, 22 should be retained until the latching occurs. This will occur naturally if the quench time 82 occurs after the end of the integration time 60i (as shown in the embodiment of illustrative FIG. 3), since in that case the avalanche diodes that are in breakdown will not yet have quenched at the time of latching. On the other hand, if the quench time is shorter than the integration time 60i then the latches 20, 22 should be of a type that holds the "true" or "on" or "activated" (et cetera) value and does not reset upon quenching of the SPAD detector. (In other words, the latch should follow a 0→1 transition but should not follow a 1→0 transition). In this case the latch will not go back to "false" or "off" or "deactivated" upon quenching of the avalanche diode. (Note that such a latch can also be used in the embodiment of FIG. 2, but whenever such a latch is used the reset portion of the completion operations 80 should include resetting the values stored in the latches 20, 22).

In the embodiment of FIG. 3, the completion circuitry 80 processes the data to generate useful positional information. In some embodiments, this entails determining the (X,Y) coordinates for each photon detection event, thus producing a "map" of these events. In other embodiments the completion circuitry 80 processes the data to generate some statistical aggregation of the photon detection events, such as a center measurement (e.g., centroid or barycenter) of the set of photon detection events and/or a width measurement (e.g., a spatial full-width-at-half-maximum or FWHM, or a maximum spread).

In the embodiment of FIG. 3, the completion circuitry 80 may be unable to completely disambiguate positional data for multiple photon detection events. For example, if column latches X1 and X2 are "on" and row latches Y1 and Y2 are on, this could correspond to any of the following photon detection event sets: [(X1,Y2) and (X2,Y1)], or [(X1,Y1) and (X2,Y2)], or [(X1,Y2) and (X2,Y1) and either or both of (X1,Y1) and/or (X2,Y2)], or [(X1,Y1) and (X2,Y2) and either or both of (X1,Y2) and/or (X2,Y1)]. What can be definitely concluded is that between two and four photon events occurred in this 2×2 SPAD detectors square. This ambiguous situation may be addressable in the completion circuitry 80 by suitable approximate processing, e.g. randomly selecting two or three SPAD detectors of the ambiguous 2×2 SPAD detectors square as being the locations of photon detection events. In general, the approach of FIG. 3 is expected to be most effective (in the sense of avoiding the aforementioned ambiguity) if the integration time 60i and the incident photon flux are such that the distribution of photon detection events over the detector array 12 is sparse, meaning that there are few (if any) occurrences of two or more photon detection events along any single row or column.

Another approach for more accurately disambiguating the positional data is to sample the rows and columns of the detector array 12 by latching these data at high speed into storage elements (not shown) such as switched capacitors or transmission gates, with the latching being initiated by the trigger signal generated by the trigger circuitry 34. If the sampling is fast enough (as compared with the average rate of photon detection events), then the time when a line changed its state is recorded, and the recorded time can be used to correlate row and column positions as well as to determine the time of arrival of the photon relative to the trigger signal.

Note that ambiguity due to multiple photon detection events is also possible in the operational mode of FIG. 2, and could occur if one or more additional photons are detected between the time of the events 50, 52 and the end of the delay 60, 70. However, these delays 60, 70 are short, which reduces the likelihood of detecting multiple photons. Also, the operational mode of FIG. 2 is typically employed in low incident photon flux applications. Nonetheless, such an ambiguous situation, if it were to occur in the operational mode of FIG. 2, is readily detected as the completion circuitry 80 would detect two or more rows and/or two or more columns whose corresponding latches store the "true" or "on" or "activated" (et cetera) value. In such a case, the processing and output circuitry 30 are suitably configured to output an error signal responsive to the latches (after latching responsive to a trigger signal generated by the trigger circuitry 34) indicating two or more SPAD detectors being in break down.

The disclosed photon detector 10 provides both high spatial and high temporal resolution. In some embodiments high temporal resolution may not be needed or practically achievable. For example, in embodiments comporting with FIG. 3 the time stamp generated by the process 56, 58 corresponds to the beginning of the integration time 60i. The temporal resolution is thus limited by the integration time 60i, and it is not useful for the time resolution of the digital time stamp to be substantially finer than the integration time 60i. In such cases the processing 56, 58 may optionally be omitted, and the TDC circuitry 28 reduced to simply recording the current clock cycle (for example) of the acquired photon detection events data. In some such embodiments the TDC circuitry 28 may be omitted entirely, and the time stamping may be performed "off-chip" by assigning a time stamp to the data as it is communicated off the silicon chip or substrate 16.

The disclosed photon detectors find diverse application in physics, astronomy, radiological imaging such as positron emission tomography (PET) or single-photon emission tomography (SPECT), or so forth.

With reference to FIG. 4, a positron emission tomography (PET) imaging application is diagrammatically shown as an illustrative example. In this application a PET scanner 90 includes a plurality of the disclosed photon detectors 10 arranged as a ring encircling a region of interest 92. The PET detector ring is suitably mounted on a housing or gantry 94, and a scintillator ring 96 is disposed inside of the ring of photon detectors 10 such that a 511 keV particle emanating from a PET imaging subject disposed in the region of interest 92 is absorbed by the scintillator ring 96 to generate a burst (i.e., scintillation) of photons that is detected by the proximate photon detector 10. In this application the integration operational mode of FIG. 3 is likely to be most useful, although it is also contemplated to employ the operational mode of FIG. 2 in conjunction with a thin scintillator having a low photon yield (e.g., emitting only one or a few photons in each 511 keV scintillation).

The resulting PET data are processed by an electronic processing device 98, for example embodied as a suitably programmed computer 100. The photon detection events (or a center of a map of photon detection events determined in the operational mode of FIG. 3) together with the digital time stamp and the particle energy (estimated from the number of photons detected during the integration time 60i) forms list mode PET data that are stored in a list mode data memory 102. A 511 keV coincidence detector 104 identifies coincident 511 keV detection events in the list mode data using suitable temporal and energy windowing. Each pair of coincident 511 keV detection events defines a line of response (LOR), and the sourcing electron-hole annihilation event can be localized along the LOR using the time stamp as time-of-flight (TOF) data. The TOF-PET data are stored in a memory 106, and are reconstructed by a suitable PET imaging data reconstruction processor 108 to form a reconstructed image that is suitably stored in a memory 110, displayed on a display 112 of the computer 100, or otherwise utilized.

While FIG. 4 illustrates a PET application, more generally the disclosed photon detectors may be used in conjunction with a radiological imaging system, such as the illustrative PET scanner 90, or as the photon detector of a radiation detector head of a gamma camera that is mounted on a robotic arm or gantry configured to orbit the radiation detector head around a region of interest, or so forth.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. An apparatus comprising:
   a photon detector including:
      a detector array comprising single photon avalanche diode (SPAD) detectors configured to break down responsive to impingement of a photon,
      trigger circuitry configured to generate a trigger signal responsive to break down of a SPAD detector of the detector array, and
      latches configured to store position coordinates of SPAD detectors of the detector array that are in break down, the latches being configured to latch responsive to a trigger signal generated by the trigger circuitry;
   wherein the latches comprise:
      row latches wherein each row latch connects with a logical "OR" combination of SPAD detectors of a corresponding row of the detector array; and
      column latches wherein each column latch connects with a logical "OR" combination of SPAD detectors of a corresponding column of the detector array.

2. The apparatus of claim 1, further comprising:
   at least one delay element that delays propagation of the trigger signal to the latches by a delay time that is effective to ensure that the latches upon latching store the position coordinates of the SPAD detector whose break down caused the trigger circuitry to generate the trigger signal.

3. The apparatus of claim 1, wherein the photon detector including the detector array, the trigger circuitry, and the latches is disposed monolithically on a silicon substrate.

4. The apparatus of claim 1, wherein the photon detector further includes:
   time to digital converter (TDC) circuitry configured to generate a digital time stamp for a trigger signal generated by the trigger circuitry.

5. The apparatus of claim 4, wherein the photon detector further includes:
   processing and output circuitry that generate and output (1) a photon detection position comprising position coordinates of a SPAD detector that is in break down based on values stored in the latches after latching responsive to a trigger signal generated by the trigger circuitry and (2) a digital time stamp generated by the TDC circuitry for the trigger signal caused the latching of the latches.

6. The apparatus of claim 5, wherein the processing and output circuitry are further configured to output an error signal responsive to the latches after latching indicating two or more SPAD detectors being in break down.

7. The apparatus of claim 1, further comprising:
a positron emission tomography (PET) scanner including a plurality of said photon detectors arranged as a detector ring encircling a region of interest.

8. An apparatus comprising:
a photon detector including:
a detector array comprising single photon avalanche diode (SPAD) detectors configured to break down responsive to impingement of a photon;
trigger circuitry configured to generate a trigger signal responsive to break down of a SPAD detector of the detector array;
latches configured to store position coordinates of SPAD detectors of the detector array that are in break down, the latches being configured to latch responsive to a trigger signal generated by the trigger circuitry; and
at least one delay element that delays propagation of the trigger signal to the latches by an integration time interval such that the latches after latching provide a position coordinates for the SPAD detectors that break down over the integration time interval.

9. A method comprising:
providing a detector array comprising single photon avalanche diode (SPAD) detectors configured to break down responsive to impingement of a photon in a position;
providing latches configured to store position coordinates of a SPAD detector of the detector array that is in break down;
generating a trigger signal responsive to break down of a SPAD detector of the detector array;
latching the latches responsive to the trigger signal; and
performing time to digital conversion triggered by the trigger signal to generate a time stamp for the breakdown of the SPAD detector whose break down caused the generating of the trigger signal.

10. The method of claim 9, further comprising:
delaying propagation of the trigger signal to the latches by a delay interval effective to ensure that the latches store position coordinates of the SPAD detector whose breakdown caused the generating of the trigger signal prior to the latching.

11. The method of claim 9, further comprising:
after the latching, reading the latches to determine a position of the SPAD detector whose breakdown caused the generating of the trigger signal.

12. The method of claim 9, further comprising:
delaying propagation of the trigger signal to the latches by an integration time; and
after the latching, reading the latches to generate an image of the SPAD detectors of the detector array that broke down over the integration interval.

13. An apparatus comprising:
a photon detector including:
an array of single photon avalanche diode (SPAD) detectors,
latches configured to store position coordinates of a SPAD detector of the array that is in breakdown,
triggering circuitry configured to generate a trigger signal responsive to break down of a SPAD detector of the array wherein the trigger signal causes latching of the latches,
processing circuitry configured to output a photon detection position based on position coordinates stored in the latched latches; and
time to digital converter (TDC) circuitry configured to generate a digital time stamp for a trigger signal generated by the trigger circuitry.

14. The apparatus of claim 13, wherein
the processing circuitry is further configured to output a photon detection time based on the digital time stamp for the trigger signal causing the latching of the latches.

15. The apparatus of claim 13, wherein the photon detector further comprises:
at least one delay element arranged to delay the latching of the latches by a delay time effective to ensure that the latched latches store the position coordinates of the SPAD detector whose break down caused the trigger circuitry to generate the trigger signal.

16. An apparatus comprising:
a photon detector including:
an array of single photon avalanche diode (SPAD) detectors,
latches configured to store position coordinates of SPAD detectors of the array that are in breakdown,
triggering circuitry configured to generate a trigger signal responsive to break down of a SPAD detector of the array wherein the trigger signal causes latching of the latches,
at least one delay element that delays the latching by an integration time, and
processing circuitry configured to output detection positions of photons detected over the integration time based on position coordinates stored in the latched latches.

17. The apparatus of claim 16, further comprising:
a scintillator viewed by the photon detector to detect scintillation photons emitted by the scintillator responsive to a radiation particle being absorbed by the scintillator;
wherein the processing circuitry is configured to compute a location of the radiation particle detection as a center of the output detection positions of photons detected by the photon detector over the integration time.

18. The apparatus of claim 17, further comprising:
a radiological imaging system comprising said scintillator and said photon detector configured as one of (1) a radiation detector ring encircling a region of interest and (2) a radiation detector head mounted on a robotic arm or gantry configured to orbit the radiation detector head around a region of interest.

* * * * *